United States Patent [19]

Kirner et al.

[11] 4,223,530

[45] Sep. 23, 1980

[54] LIQUID FUEL ROCKET ENGINE HAVING A PROPELLANT COMPONENT PUMP TURBINE WITH A SECONDARY THRUST DISCHARGE AND TO A METHOD OF OPERATING A LIQUID FUEL ROCKET ENGINE

[76] Inventors: Erich Kirner, Bernaysstr. 42, 8000 München 45; Helmut Dederra, Mozartstr. 87a, 8012 Ottobrunn, both of Fed. Rep. of Germany

[21] Appl. No.: 944,750

[22] Filed: Sep. 22, 1978

[30] Foreign Application Priority Data

Sep. 30, 1977 [DE] Fed. Rep. of Germany ....... 2743983

[51] Int. Cl.² .............................................. F02K 9/02
[52] U.S. Cl. ....................................... 60/204; 60/259; 60/267
[58] Field of Search .......................... 60/259, 267, 204

[56] References Cited

U.S. PATENT DOCUMENTS

| 3,028,729 | 4/1962 | Ledwith | 60/259 |
|---|---|---|---|
| 3,077,073 | 2/1963 | Kuhrt | 60/259 |
| 3,516,254 | 6/1970 | Hammond | 60/267 |
| 4,055,044 | 10/1977 | Dederra et al. | 60/267 |

FOREIGN PATENT DOCUMENTS 1950407  4/1971  Fed. Rep. of Germany ............. 60/259

*Primary Examiner*—Robert E. Garrett

*Attorney, Agent, or Firm*—McGlew and Tuttle

[57] ABSTRACT

A method of operating a liquid fuel rocket engine having at least first and second propellant component pumps, driven by a gas turbine which is connected to discharge its turbine propulsion gases through a secondary thrust nozzle, includes a main engine having a combustion chamber with a thrust nozzle, an initial expansion portion with an expansion corresponding to ground pressure and a final expansion portion connected to the initial expansion portion and terminating in a thrust discharge operating substantially at vacuum and with means for circulating at least one propellant component through cooling channels of the walls of both expansion portions, comprises, directing a first component into the combustion chamber, and directing at least a first portion of a second propellant component into the walls of the initial expansion portion and then into the combustion chamber and directing a second portion of the second propellant component into the walls of the final expansion portion so that they are heated therein and, thereafter, directing the heated propellant component gases into the turbine. The liquid fuel rocket engine for operation in outer space, comprises, wall means defining a combustion chamber having an injection head and a thrust nozzle part with a narrow neck portion, an initial expanding portion and a final expanding portion which terminates in a thrust discharge.

11 Claims, 1 Drawing Figure

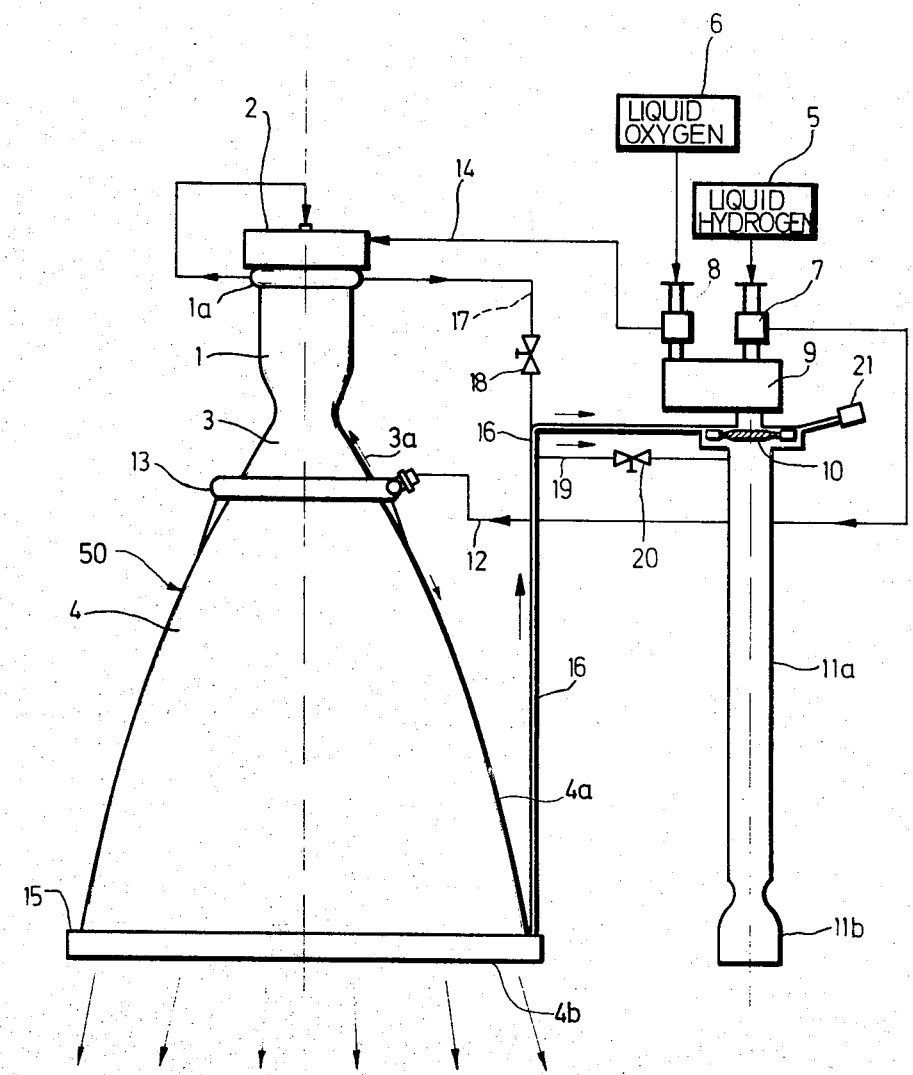

LIQUID FUEL ROCKET ENGINE HAVING A PROPELLANT COMPONENT PUMP TURBINE WITH A SECONDARY THRUST DISCHARGE AND TO A METHOD OF OPERATING A LIQUID FUEL ROCKET ENGINE

FIELD AND BACKGROUND OF THE INVENTION

This invention relates to liquid fuel rocket engines in general and, in particular, to a new and useful rocket engine of a secondary flow design for operation in vacuum or almost in vacuum, and comprising, a combustion chamber with a convergent/divergent thrust nozzle part, in particular, with an expansion rate corresponding to ground pressure, a vacuum thrust nozzle part, fuel pumps to pump the liquid fuels, in particular, oxygen and hydrogen, one or more turbines with admission of hot propellant gases to drive the fuel pumps and with the turbine exhaust gases discharging into the open through a secondary flow nozzle and with a small partial amount of a liquid fuel, in particular, hydrogen, flowing through cooling channels in the wall of the vacuum nozzle part.

DESCRIPTION OF THE PRIOR ART

According to U.S. Pat. No. 4,055,044 issued Oct. 25, 1977, liquid fuel rocket engines of a secondary flow design are known in which one of the two liquid fuels, namely, the hydrogen, is used to cool both the combustion chamber and the convergent/divergent thrust nozzle part, and to cool the so-called vacuum nozzle on the other. The procedure is such that, at the point where the convergent/divergent thrust nozzle part and the vacuum nozzle part separate, a distributor ring for the liquid hydrogen is provided, from which the much greater partial amount of hydrogen flows forward through cooling channels in the wall of the convergent/divergent thrust nozzle part and of the combustion chamber to then be fed to the injection head of the combustion chamber, into which the oxygen is also introduced, whereas, the smaller amount of hydrogen flows backwardly through cooling channels in the wall of the vacuum nozzle, is heated in the process and discharges at the rear end of the vacuum nozzle through many small thrust nozzles distributed over the periphery.

In secondary flow rocket engines, the fuel pumps are driven by a gas turbine which operates in the secondary flow mode and to which propellant gases which are produced in a separate, smaller combustion chamber are admitted to a so-called gas generator, through reaction of partial amounts of the two fuel components. The turbine exhaust gases then discharge into the open through a secondary flow thrust nozzle. Since the intake temperature of the hot turbine propellant gases must not exceed 900° C. for material reasons, and is thus far below the stoichiometric combustion temperature, the gas generator must be operated with a great hydrogen excess so that, in this regard, the loss of efficiency is unavoidable in the secondary flow method.

SUMMARY OF THE INVENTION

The present invention provides a liquid fuel rocket engine which has both a greater power yield at the same fuel consumption and a better power/weight ratio, and is simpler in its structural design than the presently known devices of this kind.

According to the invention, a liquid fuel rocket engine includes a construction such that the propellant gases of one fuel, in particular, of hydrogen, which is produced in the cooling channels in the wall of the vacuum nozzle part, flows through the turbine or turbines driving the fuel pumps.

The invention offers the advantage that a gas generator to generate gases to drive the turbines is eliminated, and the two amounts of fuel required for the operation of the gas generator are now also available for the stoichiometric combustion process in the actual rocket combustion chamber, which is much more favorable from an efficiency point of view. The overall efficiency of the engine is thereby considerably improved.

The structural engine system design is further simplified by designing the cooling system for the vacuum thrust nozzle part so that the turbine drive gases discharging from this cooling system have an intake temperature which is still permissible for this turbine. In a certain rocket engine power range of between 50,000 N and 60,000 N, it is even, so that, with regard to the cooling capacity of the vacuum nozzle, the propellant gases produced there practically have the capacity, with respect to amount and temperature, required to drive the turbine.

In order to be able to compensate for small differences between the usable capacity of the propellant gases produced in the vacuum nozzle cooling system and the turbine capacity required, the invention provides that if the propellant gas capacity is insufficient, an additional amount of gas is supplied to the propellant gases from the cooling system of the convergent/divergent thrust nozzle and from the combustion chamber. Conversely, if there is an excess of propellant gas, a partial amount of the propellant gases can be conducted directly to the turbine exhaust through a bypass line and then relieved in the secondary flow nozzle, together with the turbine exhaust gases.

Due to the elimination of the gas generator to produce the propellant gases for the turbine driving the pumps, as accomplished by the invention, an improvement of the power to weight ratio and an economical reduction of costs of the engine system are achieved.

Accordingly, it is an object of the invention to provide a method of operating a liquid fuel rocket engine having at least first and second propellant component pumps which are driven by a gas turbine which is connected to discharge its turbine propulsion gases through a secondary thrust nozzle and which includes a main engine having a combustion chamber with a thrust nozzle, an initial expansion portion with an expansion corresponding to ground pressure and a final expansion portion connected to the initial expansion portion and terminating in a thrust discharge operating substantially at vacuum and with means for circulating at least one propellant component through cooling channels of the walls of both expansion portions and which comprises, directing a first component into the combustion chamber, and directing at least a first portion of a second propellant component into the walls of the initial expansion portion and then into the combustion chamber and directing a second portion of the second propellant component into the walls of the final expansion portion so that they are heated therein and, thereafter, directing the heated propellant component gases into the turbine.

Another object of the invention is to provide a liquid fuel rocket engine for operation in outer space, which comprises, wall means defining a combustion chamber having an injection head and a thrust nozzle part with a narrow neck portion, and initial expanding portion and a final expanding portion which terminates in a thrust discharge and, wherein, said combustion chamber, said narrow neck portion, said initial expansion portion and said final expansion portion have channels therein for the circulation of the propellant component therethrough for cooling the walls thereof, and further including a gas turbine connected to first and second propellant pumps to operate them for directing a first propellant component into the combustion chamber and for directing a second propellant component partially through the wall of the initial expansion portion and then into the combustion chamber and partially through the walls of the final expansion portion and then into the turbine for operating the turbine and thereafter discharging the gases through a separate secondary flow nozzle connected to the turbine.

A further object of the invention is to provide a liquid fuel rocket engine which is simple in design, rugged in construction, and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawing and descriptive matter in which a preferred embodiment of the invention is illustrated.

BRIEF DESCRIPTION OF THE DRAWING

The only FIGURE of the drawing is a schematic representation of a liquid fuel rocket engine, constructed in accordance with the invention.

DESCRIPTION OF THE PREFERRED EMBODIMENT

Referring to the drawing in particular, the invention embodied therein, comprises, a liquid fuel rocket engine, generally designated 50, which is operated by propellant components, such as liquid oxygen, contained in an oxygen storage tank 6, and a second propellant component, such as, liquid hydrogen, contained in a liquid hydrogen storage tank 5. The propellant components are supplied by pumps 8 and 7, respectively, which are driven from a turbine 10 through a transmission 9.

The gases for operating the turbine are directed outwardly through a secondary flow thrust tube 11a having a thrust nozzle 11b which discharges separately from a main combustion chamber 1.

The rocket engine, as a secondary flow engine operating with liquid fuels, in particular, hydrogen and oxygen, comprises, a combustion chamber 1 with an injection head 2 and a convergent/divergent thrust nozzle part 3 with an expansion rate for operation on the ground or at low altitudes, and a vacuum thrust nozzle part 4 (with an expansion rate for operation in outer space) terminating in a thrust discharge 4b. A tank 5 for liquid hydrogen and a tank 6 for liquid oxygen are connected with a fuel pump 7 for the hydrogen and a fuel pump 8 for the oxygen to supply these propellant components to a gas turbine 10 which drives the two pumps 7 and 8 through gearing 9. The gas turbine 10 is at the inner end of a secondary flow thrust tube 11a with secondary thrust nozzle 11b.

The hydrogen pumped by the fuel pump 7 is supplied to a distributor ring or header 13 through a line 12. The great majority of the total amount of hydrogen is conducted from this distributor ring 13 to cooling channels 3a in the wall of the thrust nozzle part 3 and of the combustion chamber 1 to cool them, whereas, only a small part or amount, i.e., 5% of the total amount of hydrogen, flows into cooling channels 4a arranged in the wall of the vacuum thrust nozzle part 4. The by far greater amount of hydrogen flowing through the wall of the thrust nozzle part 3 and of the combustion chamber 1 is collected at a ring or header 1a provided at the front end of the combustion chamber and is then fed to the injection head 2 and is injected into the combustion chamber 1, together with the entire quantity of oxygen which is supplied through a line 14.

The amount of vaporous hydrogen heated in the cooling channels in the wall of the vacuum thrust nozzle 4 is collected in a ring or collection header 15 and is fed through a line 16 to the turbine 10 driving the pumps. The turbine exhaust gases are further relieved in the secondary flow nozzle 11b, providing a certain additional thrust in the nozzle.

A line 17 runs through from the collecting ring 1a to line 16. An additional small amount of gas flows through line 17 to the turbine 10 for the power control of turbine 10 by means of a valve 18. In addition, a bypass line 19 with a valve 20, runs from line 16 to the turbine exhaust so that, in the event of a drive gas excess, the excess quantity can flow directly into the thrust tube 11a.

The propulsive charge 21 connected to the turbine 10 serves to start the engine and the gas turbine 10 driving the fuel pumps 7 and 8, respectively.

While a specific embodiment of the invention has been shown and described in detail to illustrate the application of the principles of the invention, it will be understood that the invention may be embodied otherwise without departing from such principles.

What is claimed is:

1. A liquid fuel rocket engine for operation in outer space, comprising, wall means defining a combustion chamber having an injection head and with a thrust nozzle part having a narrow neck portion, an initial expanding portion having an expansion of substantially ground pressure and a vacuum expanding portion connected to said initial expanding portion and terminating in a thrust discharge, each of said combustion chamber, said initial expansion portion and said final expanding portion having walls with cooling channels extending therethrough for the circulation of a propellant component therethrough, a propellant component pump gas turbine, first and second propellant component pumps connected to said gas turbine for operation thereby, a first propellant component supply tank connected to said first propellant component pump, a second propellant component supply tank connected to said second propellant component pump, a secondary flow nozzle connected to said turbine for the discharge of the turbine exhaust gases, a distributor ring connected to the cooling channels of said initial expansion portion and said final expansion portion for circulating a first portion of said second propellant component to the cooling channels of said initial expansion portion, and a second portion of said second propellant component to the cooling channels of said second expansion portion, a first collecting ring connected to said final expansion portion and disposed adjacent said discharge, a second circulating line connected to said second propellant component pump and said distributor ring for supplying a second propellant component to said distributor ring, a second collecting ring connected to said cooling channels of said initial expanding portion and disposed adjacent said head, and a first connection line from said collecting ring to said turbine for directing a portion of said second propellant component gases to said turbine after they have been heated in the cooling channels of said final expansion portion.

2. A liquid fuel rocket engine, as claimed in claim 1, including a second connection line from said second collecting ring to said first connection line for directing a portion of said first propellant component to said turbine.

3. A liquid fuel rocket engine, as claimed in claim 1, including a bypass connection between said first connection line and said secondary flow nozzle for bypassing some of the gases of said portion of said second propellant component.

4. A liquid fuel rocket engine, as claimed in claim 3, including a control valve in said bypass for controlling the amount of gases which are bypassed.

5. A liquid fuel rocket engine, as claimed in claim 1, wherein the cooling channels in said initial expansion portion and said final expansion portion and the connection to said distributor ring are such that a far greater amount of the second propellant component flows through said initial expansion portion than flows through said final expansion portion.

6. A liquid fuel rocket engine, as claimed in claim 1, including a second connection line from said collecting ring to said first connection line and a regulating valve in said second connection line for regulating the power control of said turbine.

7. A method of operating a liquid fuel rocket engine having at least a first and a second propellant component pump driven by a gas turbine, which is connected to discharge its turbine propulsion gases through a secondary thrust nozzle which includes a main combustion chamber with a thrust nozzle and an initial expansion portion with an expansion corresponding to ground pressure, and a final expansion portion connected to the initial expansion portion which terminates in a thrust discharge operating at substantially vacuum and with means for circulating at least one portion of a first propellant component through the cooling channels of the walls, the initial expansion portion and the combustion chamber, and at least one second portion through the channels of the walls of the final expansion portion, comprising, directing the first propellant into the combustion chamber, directing a first portion of the second propellant component into the initial expansion portion and the combustion chamber cooling channel and directing a second portion into the walls of the final expansion portion so that they are heated therein and directing the heated portion of the second propellant component into the turbine to operate the turbine.

8. A method of operating a liquid fuel rocket engine, as claimed in claim 7, wherein a far larger proportion of the second propellant component is circulated through the initial expansion portion and the combustion chamber walls than through the final expansion portion.

9. A method of operating a liquid fuel rocket engine, as claimed in claim 7, wherein a portion of the second propellant component which is first circulated through the initial expansion portion and the combustion chamber walls is thereafter directed into the gas turbine in order to control the power of the gas turbine.

10. A method of operating a liquid fuel rocket engine, as claimed in claim 7, wherein a portion of the second propellant component which is circulated through the initial expansion portion and the combustion chamber walls is directed into the injector head along with the first propellant component.

11. A method of operating a liquid fuel rocket engine, as claimed in claim 7, including bypassing a portion of the second propellant component which is directed through the final expansion portion so that it is directed through the discharge of the turbine and does not propel the turbine.

* * * * *